United States Patent
Lowagie

(10) Patent No.: US 11,481,518 B2
(45) Date of Patent: Oct. 25, 2022

(54) BLOCKCHAIN-BASED METHOD FOR REGISTRATION AND VERIFICATION OF A FILE

(71) Applicant: ITEXT GROUP NV, Gentbrugge (BE)

(72) Inventor: Bruno Lowagie, Sint-Amandsberg (BE)

(73) Assignee: ITEXT GROUP NV, Gentbrugge (BE)

( * ) Notice: Subject to any disclaimer, the term of this patent is extended or adjusted under 35 U.S.C. 154(b) by 450 days.

(21) Appl. No.: 16/473,069

(22) PCT Filed: Dec. 14, 2017

(86) PCT No.: PCT/EP2017/082801
§ 371 (c)(1),
(2) Date: Jun. 24, 2019

(87) PCT Pub. No.: WO2018/114585
PCT Pub. Date: Jun. 28, 2018

(65) Prior Publication Data
US 2020/0099534 A1    Mar. 26, 2020

(30) Foreign Application Priority Data

Dec. 22, 2016 (BE) .................................. 2016/5964
Dec. 22, 2016 (BE) .................................. 2016/5965
(Continued)

(51) Int. Cl.
*H04L 9/40* (2022.01)
*G06F 21/64* (2013.01)
(Continued)

(52) U.S. Cl.
CPC ............ *G06F 21/64* (2013.01); *G06F 16/152* (2019.01); *G06F 21/31* (2013.01); *G06F 21/602* (2013.01);
(Continued)

(58) Field of Classification Search
CPC ........ G06F 21/64; G06F 16/152; G06F 21/31; G06F 21/602; G06F 21/645;
(Continued)

(56) References Cited

U.S. PATENT DOCUMENTS 5,884,322 A   3/1999 Sidhu
6,938,157 B2  8/2005 Kaplan
(Continued)

*Primary Examiner* — Ghodrat Jamshidi
(74) *Attorney, Agent, or Firm* — Cermak Nakajima & McGowan LLP; James Creighton Wray

(57) ABSTRACT

The present invention relates to a computer-implemented method for the signed registration of a file, preferably a PDF-based document, by a user in a blockchain, said method comprising the steps of: (a) receiving said file from said user; (b) processing said file and calculating a hash for said file, said step (b) comprising the sub-steps (b.i) processing said file by creating and/or revising a file identifier comprised in said file so that it is unique with respect to the blockchain, obtaining a uniquely identified file; (b.ii) calculating the hash of said uniquely identified file comprising said file identifier with a cryptographic hash function; (b.iii) optionally, determining if the hash obtained in step (b.ii) is unique with respect to the blockchain and if so, ending step (b); if not, resuming from step (b.i); (c) establishing a file reference taking into account said hash; and (d) registering said file reference in the blockchain.

15 Claims, 2 Drawing Sheets

(30) Foreign Application Priority Data

Dec. 22, 2016 (BE) .................................. 2016/5966
Oct. 25, 2017 (WO) .................. PCT/IB2017/056624

(51) Int. Cl.

| | | |
|---|---|---|
| *G06F 16/14* | (2019.01) | |
| *G06F 21/60* | (2013.01) | |
| *H04L 9/06* | (2006.01) | |
| *H04L 9/08* | (2006.01) | |
| *H04L 9/30* | (2006.01) | |
| *H04L 9/32* | (2006.01) | |
| *G06F 21/31* | (2013.01) | |
| *H04L 9/00* | (2022.01) | |

(52) U.S. Cl.
CPC .......... *G06F 21/645* (2013.01); *H04L 9/0637* (2013.01); *H04L 9/0643* (2013.01); *H04L 9/0891* (2013.01); *H04L 9/3073* (2013.01); *H04L 9/3236* (2013.01); *H04L 9/3247* (2013.01); *H04L 9/3263* (2013.01); *H04L 9/50* (2022.05)

(58) Field of Classification Search
CPC ... H04L 9/0637; H04L 9/0643; H04L 9/0891; H04L 9/3037; H04L 9/3236; H04L 9/3247; H04L 9/3263; H04L 2209/38
See application file for complete search history.

(56) References Cited

U.S. PATENT DOCUMENTS

| | | | | |
|---|---|---|---|---|
| 7,356,843 | B1* | 4/2008 | Kingsford | G06F 21/552 |
| | | | | 707/999.2 |
| 10,114,969 | B1* | 10/2018 | Chaney | H04L 9/3247 |
| 10,735,199 | B2* | 8/2020 | Sanghvi | H04L 9/3236 |
| 2007/0038857 | A1 | 2/2007 | Gosnell | |
| 2008/0256019 | A1* | 10/2008 | Alpern | G06F 16/14 |
| 2011/0107084 | A1* | 5/2011 | Hubner | H04W 12/033 |
| | | | | 713/153 |
| 2013/0169985 | A1* | 7/2013 | Inomata | G06F 21/608 |
| | | | | 358/1.13 |
| 2014/0109082 | A1* | 4/2014 | Kimmet | G06F 11/3051 |
| | | | | 717/176 |
| 2014/0379585 | A1 | 12/2014 | Buelloni | |
| 2016/0212146 | A1 | 7/2016 | Wilson | |
| 2016/0330027 | A1* | 11/2016 | Ebrahimi | G06Q 20/02 |
| 2017/0053125 | A1* | 2/2017 | Savagaonkar | G06F 21/60 |
| 2017/0236121 | A1* | 8/2017 | Lyons | G06Q 20/065 |
| | | | | 705/71 |
| 2017/0346693 | A1* | 11/2017 | Dix | H04L 9/3265 |
| 2018/0025181 | A1* | 1/2018 | Barinov | G06F 21/645 |
| | | | | 726/26 |
| 2018/0082256 | A1* | 3/2018 | Tummuru | G06Q 10/1053 |
| 2018/0157700 | A1* | 6/2018 | Roberts | G06F 16/2365 |
| 2018/0285376 | A1* | 10/2018 | Duan | G06F 16/182 |
| 2018/0314807 | A1* | 11/2018 | Mei | G06F 16/93 |

* cited by examiner

BLOCKCHAIN-BASED METHOD FOR REGISTRATION AND VERIFICATION OF A FILE

This application claims the benefit of Belgian Application No. BE2016/5964 filed 22 Dec. 2016, Belgian Application No. BE2016/5965 filed 22 Dec. 2016, Belgian Application No. BE2016/5966 filed 22 Dec. 2016, PCT/IB2017/056624 filed 25 Oct. 2017 and PCT/EP2017/082801 filed Dec. 14, 2017, International Publication No. WO 2018/114585 A1, which are hereby incorporated by reference in their entirety as if fully set forth herein.

TECHNICAL DOMAIN

The present invention relates to the technical domain of signed registration and verification of a file, preferably a PDF-based document.

STATE OF THE ART

A problem with the known methods for signing a files and PDF-based documents is the need for a central authority for the registration of the signature.

US 2016/0330027 discloses related methods and systems. US 2016/0330027 however lacks means for handling files.

The Proof of Existence initiative as detailed on the website poex.io disclosed a related method and system. This initiative however lacks provisions for verifying authenticity.

US 2016/0212146 describes systems and methods using a blockchain for recording a file date and for avoiding manipulation, even for documents that are secret and also for those stored in uncontrolled environments. These systems and methods do not require that any confidence is placed in a timestamping authority or a document filing service. A trusted timestamping authority can be used, but even when this timestamping authority loses its credibility or when a third party refuses to recognize the validity of a time stamp, a date for an electronic document can still be specified.

A disadvantage of a method according to US 2016/0212146 is the lack of a mechanism for retrieving the author of a document. In terms of document security, this means that the authenticity of a document cannot be retrieved. In the same context, US 2016/0212146 does not offer a provision for non-repudiation, as a result of which an author of a particular document can deny the involvement in the realization of the particular document at his own discretion.

U.S. Pat. No. 6,938,157 discloses a system that can process a digital representation (DF) of a document with a one-way cryptographic hash function (CHF) into a digital fingerprint (DFP) value linked to the DF. A document-IDentification number (DID) is created, which is linked in a unique way to the DFP, and to the DID and DFP, optional reference data (C) are associated. A registration certificate DFC that represents an optional electronic signature related to the document and that comprises the DID and DFP, is proclaimed and archived at a plurality of storage locations. The system can verify if an alleged document is the original by generating a digital finger print value for the alleged document, and by comparing it with the DFP collected from several of the storage locations. Verification can confirm that the electronic signature has been unmodified.

A problem with a method according to U.S. Pat. No. 6,938,157 is the absence of a mechanism for irreversibly recording the signature. U.S. Pat. No. 6,938,157 also lacks provisions for authenticity and non-repudiation.

The present invention aims to find a solution for at least some of the above-mentioned problems.

There is a need for an improved method for signed registration and verification of a file, wherein there is no need for a central authority when registering or verifying the file.

SUMMARY OF THE INVENTION

In a first aspect, the invention provides a computer-implemented method for the signed registration of a file according to claim 1.

Hereby, it is to be noted that US 2016/0330027 lacks any provision for handling files, whereby "PDF417" mentioned therein relates to a stacked linear barcode symbol format, and not to the well-known portable document format. This contrasts with the present invention, which is aimed specifically at handling files, such as PDF-based documents.

The advantages of the present invention are appreciated by the skilled person as having regard to both the signed registration in the blockchain and the advantageous features of the file processed according to the present invention. Due to the presence of a file identifier in the document, preferably concerning a file ID pair, there is no need for a separate "code" as it is required e.g. in a concept according to US 2016/0330027. Having the file suffices to locate and retrieve the file reference in the blockchain. This clearly leads to greater ease of use of the file processed according to the present invention. At the same time, the presence of a file identifier in the document allows for improvements at the side of the blockchain. By adding a unique file identifier, that hash that was registered in the blockchain will differ from hashes of related material, even in case of files which, except for the file identifier, are identical. Given the typically public character of blockchains, this may may be desirable for the user for privacy reasons. Such is however impossible with a concept according to US 2016/0330027.

In a particularly preferred embodiment, said step (b) comprises said sub-step (b.iii) for determining whether the hash is unique with respect to the blockchain.

The revising of the file identifier with impact on a hash according to the present invention is advantageous because it provides the user with two means for unique identification of the processed file with respect to the blockchain, namely the file identifier and the file hash. This implies that the user may rely on the file hash for unique identification of its file also on the many known web-related fora where identification of the file by means of its file hash is common practice. Such a unique identification by means of the file hash is not enabled nor hinted upon by US 2016/0330027. This revising has some similarities with the way in which the nonce is iteratively revised in the bitcoin blockchain. See e.g. the widely disseminated bitcoin-related paper "Bitcoin: A Peer-to-Peer Electronic Cash System" with reported author Satoshi Nakamoto. However, as such revising has a completely different aim, at least three differences can be identified, as stated in the detailed description below.

In a preferred embodiment, said file is a PDF-based document, wherein said file identifier concerns a file ID pair comprising a first ID and a second ID; wherein said file ID pair preferably concerns an ID array corresponding to ISO 32000-1 and/or ISO 32000-2 comprising a first byte string concerning a first file identifier and a second byte string concerning a second file identifier, wherein said ID array is not encrypted independent of the fact whether or not a portion of said file has been encrypted; wherein said first ID concerns a permanent ID for identifying an original version of said file; wherein said second ID concerns a changing ID for identifying an adapted version of said file; and wherein said creating and/or revising of the file identifier in step (b.i) involves revising solely said second ID so that said file ID pair is made unique with respect to the blockchain while preserving the first ID.

The advantages of the invention are particularly pronounced in such an embodiment, where the invention provides an answer to a well-known and publicized need for a unique file identifier. Such file identifier already being part of existing PDF specifications, the ISO 32000-2 specification states that "PDF writers should attempt to ensure the uniqueness of file identifiers" (See Sect. 14.4), but does not provide an adequate solution to this problem. Instead, the specification suggests applying a message digest algorithm, i.e. a hashing algorithm to information such as "the current time, the string representation of the file's location [or] the size of the file in bytes" (see Sect. 14.4). Such an approach, which is commented in more detail below, is clearly inadequate and may easily lead to file identifiers not being unique.

An additional advantage of the invention lies in its advantageous avoidance of registering personal information in the blockchain. Since only identifiers of the document, and not the actual contents of the document is stored in the blockchain, there is no risk of having the contents disclosed when, for instance, a security-related algorithm is outdated and/or hacked. This is important particularly in view of the General Data Protection Regulation (GDPR) (Regulation (EU) 2016/679) which requires that, upon request of a citizen, personal information is removed. In view of the GDPR, direct registration of personal information in the blockchain should be avoided, since such registration cannot be removed afterwards.

According to another preferred embodiment, the method, preferably step (b.i), further comprises processing said file by adding a blockchain identifier to said file for identifying the blockchain used for the signed registration of said file. In a further preferred embodiment, said blockchain identifier is encrypted by means of a blockchain-related private key belonging to a blockchain-related key pair belonging to a blockchain-related authority, said blockchain-related key pair comprising said blockchain-related private key and a blockchain-related public key. This embodiment is advantageous since it allows examining which blockchain was used when verifying the file. One may imagine an attacker, e.g. a rogue vendor, to use a "fake" blockchain different from the blockchain used for signed registration in order to mislead a victim. Official organizations, such as governments, may set up an official blockchain that can be verified by a customer as being the real blockchain for e.g. the purpose of sending invoices. If such an invoice, i.e. an electronic file, comprises a blockchain identifier pointing toward an incorrect blockchain, the vendor did not use the official blockchain, and the invoice is likely fake. Said further preferred embodiment with encryption by means of a blockchain-related private key is advantageous since it may further enhance security, by having e.g. a government officially sign a blockchain identifier with its private key, according to e.g. a set-up wherein the government acts as root CA.

In a second aspect, the invention provides a computer-implemented method for the verification of a file according to claim 12, whereby preferably step (02) comprises extracting a blockchain identifier, and wherein step (03) preferably comprises determining a location of said blockchain based on said blockchain identifier. Said verification method advantageously makes use of all the verifiable information comprised in the file reference and the file as produced by the present invention.

According to a third aspect, the present invention offers a system for the signed registration of a file according to claim 14.

In a fourth aspect, the invention relates to a system for the verification of a file according to claim 15.

According to another aspect, the invention offers the use of the method for signed registration of a file according to the present invention, preferably in the system for signed registration of a file according to the present invention, for processing a file so that it is provided with a file identifier that is unique with respect to the blockchain, preferably with a file identifier and a hash that are both unique with respect to the blockchain.

According to another aspect, the invention provides a file according to claim 19.

In another aspect, the invention relates to a computer program product for signed registration of a file according to claim 20.

In another aspect, the invention relates to a computer program product for verification of a file according to claim 21.

Further preferred embodiments of the present invention will be described in the detailed description and the claims.

DETAILED DESCRIPTION

Figure 1:
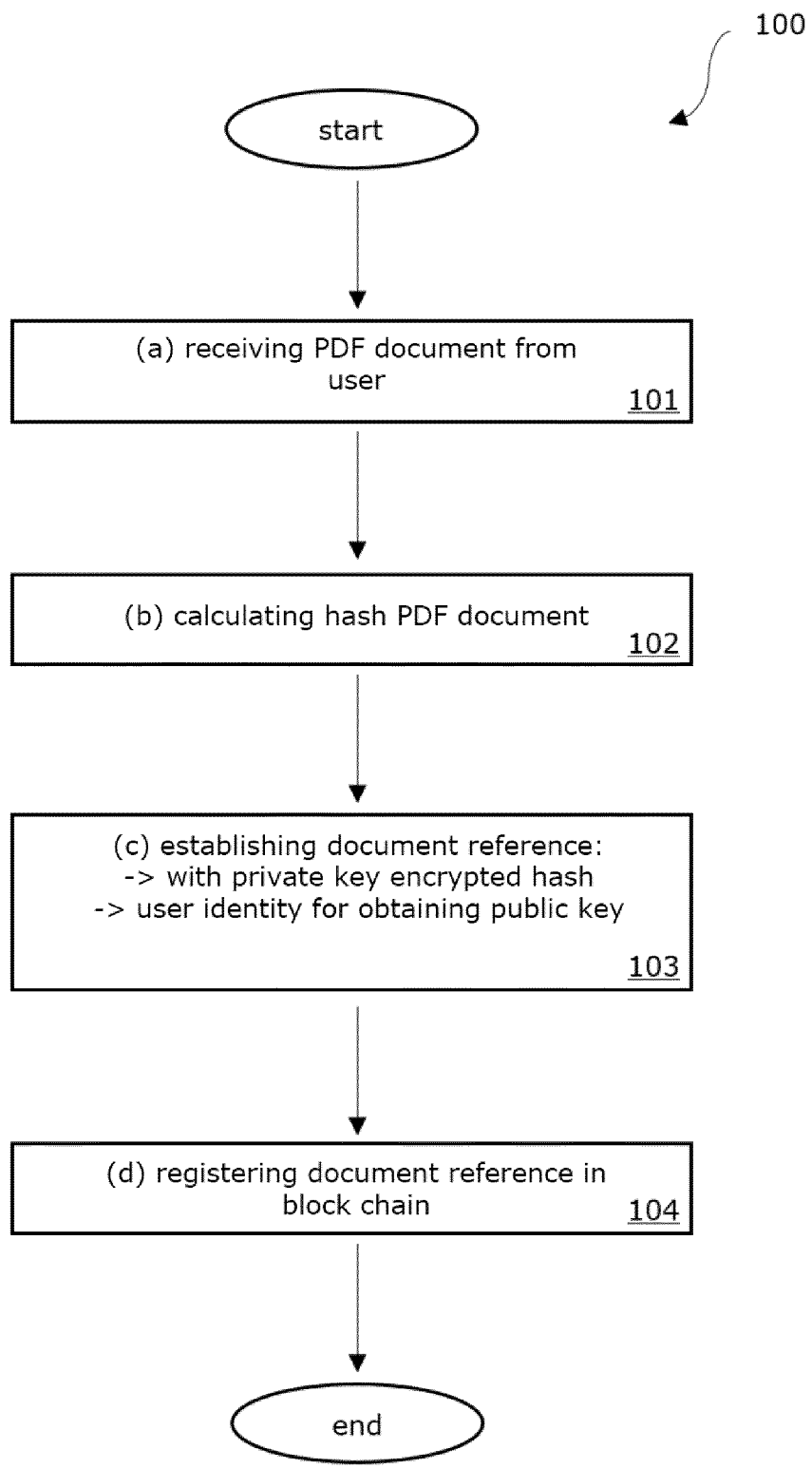
FIG. 1 illustrates an exemplary embodiment of a method of the present invention.

In a preferred embodiment, the file is a "PDF-based document", that is, a digital file based on the "Portable Document Format" file format. The category of PDF-based document comprises all PDF documents, but also all other files comprising portions of code relating to the PDF standard. Below, you will find a non-limiting list of examples. A first example of a PDF-based document is a PDF document. A second example is a PDF portfolio, a container format that is appropriate for comprising several PDF files and related data. A third example is an XFA file (XML Forms Architecture), a mark-up language in which a dynamic form is made in XML (eXtensible Markup Language), but in which the XML code is compressed and saved in a PDF file. Such a XFA file can be processed by PDF processors supporting the XFA specification. A fourth example is a successor or variant to the present PDF file format, of which the aim is similar to that of the present PDF file format.

In the context of the present document, a user ensures the "signing" and "registering", also called "signed registration" of a file, preferably a PDF-based document. The "author" of the document is the person or entity who has written the document and/or to whom the document belongs. In this respect, it is always assumed that the user and the "author" are directly related. It will however be clear that this includes a multitude of embodiments of the present invention, and that the user can for example be a person working together with the author and carrying out the signed registration on behalf of the author, but not being the owner of the document. It is for example also possible that the author is not an individual, but for example a company, in which the user is then for example an individual worker of the company, who is at the same time not the person who has written the document. Furthermore, the author need not be or represent a physical person, and may as well be a machine, e.g. a computer running an appropriate automated algorithm.

In the present document, the term "hash" refers to a second bit string, an output string, that is obtained by having a cryptographic hash function act upon a file, for instance a PDF-based document, corresponding to a first bit string, as input string. The terms "hash function" and "hashing algorithm" are hereby equivalent. For being significant, this hash function has to convert the long first bit string into a (much) shorter second bit string. Furthermore, the chance that the hash already figures as a hash of another file, for instance another PDF-based document, must be very low, so that the hash can be a useful form of unique "finger print" of the document. This "finger print" is usually referred to with the term "message digest". It should also be impossible to reconstruct portions of the original document from the obtained hash, i.e. the hash function should be "one-way". In a preferred embodiment, the cryptographic hash function is thus a function meeting all of these criteria, such as an algorithm belonging to the family of Secure-Hash-Algorithms (SHA), such as for example SHA-256. Hereby, it should be noted that the possibility of a non-unique hash cannot be excluded theoretically; when two non-identical documents correspond to the same hash after separate application of the same hash function, this is called a "hash collision". This is to be distinguished from the case where two documents are completely identical, i.e. with contents including file identifier identical. This leads to identical hashes but is not typically referred to as hash collision. In a preferred embodiment of the present invention, the invention comprises provisions for taking into account the possibility of identical hashes, whether caused by hash collision or not, for example by using a supplementary hash and/or using a document-ID-pair.

In the present document, the terms "public key" and "private key" refer to aspects of Public Key Infrastructure (PKI). PKI is used for recording the identity of a person or organization. PKI comprises the use of a key pair comprising two keys:
 a private key that must be kept secret by the owner of the private key. This private key is typically saved on a Hardware Security Module (HSM) and/or smart card and/or USB token and/or similar device of which it cannot be retrieved;
 a public key that can be shared with the world, and comprises information about the owner.

The private key can never be retrieved based on the public key, they form a pair because a message that has been encrypted with the one key can only be decrypted by means of the other key. In the context of the present invention, such a key pair is used for signing a hash. By signing the hash with the private key, it is possible for a receiver of the encrypted hash to retrieve the original hash, by using the public key, which, in a method of the present invention, can be retrieved based on the user identity. If such decryption is successful, nobody else than the owner of the private key can encrypt the hash. In this way, the receiver is thus certain of the origin of the encrypted hash.

In the context of the present document, the terms "document reference", "document signature" and "file signature" are used interchangeably. The terms "file" and "document" are also used interchangeably. Likewise, the term "file ID pair" and "document ID pair" are interchangeable. Hence, the term "document" should never be interpreted as limiting the invention to files that adhere to some narrow interpretation of the term "document", and hence always refers to "files" in the broadest sense of that word, being a string of binary digits adapted to be stored on electronic means or exchanged on a digital electronic network.

In this document, the term "blockchain" refers to a distributed database keeping a continuously growing list of registrations in blocks, which are specified incontestably, are kept up to date and cannot be adapted. Hereby, it is immaterial which variant of blockchain is intended, and all distributed ledger technology (DLT) may serve as the blockchain mentioned in claim 1. Moreover, in a preferred method, the present invention is agnostic with respect to the specific blockchain used, and may be applied to any of a wide range of blockchain types without requiring alteration. In a preferred embodiment, the use of multiple blockchain types is possible concurrently, with e.g. a system that has access to multiple blockchains and registers a file A in blockchain A for user A while registering a file B in blockchain B for user B. Related, the term "blockchain" and "distributed ledger technology" are used interchangeably in this document. This includes all common types of blockchains and related ledgers known to the skilled person. Hereby, it may concern a permissionless or permissioned blockchain, a public or private blockchain, a blockchain with centralized, decentralized, or distributed ledger control. The consensus mechanism involved in the adding of data to the blockchain preferably concerns distributed consensus. This may involve proof-of-work but may also and/or alternatively involve any of the following: proof-of-stake, a leader-based system, a voting-based system or a principle based on hashgraph.

In a preferred embodiment, without limiting the scope of the invention, the blockchain, as distributed ledger technology, fulfils following conditions:
 The records can be replicated over multiple nodes in a network (decentralized environment).
 New records can be added by each node, upon consensus reached by other nodes (ranging from one specific authoritative node to potentially every node).
 Existing records can be validated for integrity, authenticity, and non-repudiation.
 Existing records can't be removed, nor can their order be changed.
 The different nodes can act as independent participants that don't necessarily need to trust each other.

Hereby, a node is a connection point in a distributed network that can receive, create, store or send data from and to other nodes in that network; a ledger is a collection of permanent, final, definitive records of transactions; and a ledger record is an entry in the ledger containing information about one or more transactions. As for instance permissioned ledgers equally fall within the scope of the present invention, alternative embodiments exist for which one of more of the above conditions are not fulfilled and/or are replaced by different additional conditions.

Accordingly, in this document, the blockchain refers to any such distributed database based on consensus, such as the bitcoin blockchain. In the context of the present document, the registrations relate to file references (or, equivalently, document references); in the known case of bitcoin, the registrations relate for example to transactions. The database is saved and maintained at a multitude of nodes, that each separately take part in the calculations that are necessary for expanding the list of registrations. It is inherent to the design of the blockchain that none of the nodes make adaptations to the existing list of registrations, that, when recording, a time or "timestamp" is associated to each of the registrations. Strictly speaking, these adaptations are possible, but only provided that some condition is fulfilled, e.g. when a majority of the calculation represented force in the nodes "conspires", which becomes more improbable as the blockchain gets larger and knows more users. Because of the advantageous characteristics, a blockchain can serve as "distributed ledger".

In the present document, the term "web-of-trust" refers to a decentralized cryptographic model and related distributed system for relating in a reliable way a public key to a user, and by extension, considering a user identity as being reliable. In an embodiment of a web-of-trust of the present invention, a particular user identity is reliable if a sufficient number of user identities already belonging to the web-of-trust consider the particular user identity as being reliable. Hereby, said number can be considered as sufficiently large if it exceeds a predefined number. Related, the term Certificate Authority (CA) relates to an authority who maintains records regarding the user identity. Particularly, the CA may keep a record of the identity of each of a plurality of users by keeping track of at least the private key belonging to the user's key pair. This may involve maintaining certificates. While a web-of-trust and a certificate authority are clearly different, in the context of the present invention, they are alternative and interchangeable means for the verification of a user's identity, said verification preferably based on the knowledge of a user's public key.

"A", "an" and "the" refer in the document to both the singular and the plural form unless clearly understood differently in the context. "A blockchain" means for example one or more than one blockchain.

According to several aspects set out in the summary section, the present invention provides computer-implemented methods, systems, uses of the computer-implemented methods according to the present invention, preferably in the systems according to the present invention, a file processed with a computer-implemented method according to the present invention, and related computer program products.

One of ordinary skill in the art may appreciate that the computer-implemented methods comprise steps which the server or a user device or the system may be configured to execute, and that the computer program product comprises according instructions. One of ordinary skill in the art will furthermore appreciate that the according systems are configured for performing the steps of the computer-implemented methods. Therefore, in this document, no distinction is made between the different aspects of the present invention, and each element of the disclosure may relate to each of the different aspects of the present invention.

In a first aspect, the invention provides a computer-implemented method according to claim 1.

As mentioned in the summary section, revising the file identifier with impact on a hash according to the present invention has some similarities with the way in which the nonce is iteratively revised in the bitcoin blockchain. See e.g. the widely disseminated bitcoin paper "Bitcoin: A Peer-to-Peer Electronic Cash System" with reported author Satoshi Nakamoto. However, at least three differences can be identified. First, the aims differ completely. The file identifier according to the present invention serves as a unique identifier, whereas there is no requirement of uniqueness for the nonce in the bitcoin blockchain. Second, in the present invention the hash concerns a hash of a file that exists independently of the blockchain, whereas the hash concerned in the bitcoin blockchain concerns a hash of (a chain of) blocks comprised in the blockchain, and hence inseparable therefrom. Third, the file identifier is stored in a file processed outside the blockchain, whereas the bitcoin blockchain lack means to perform such file processing. In the case of the preferred embodiment where the file identifier is modified iteratively until the file hash is unique, a further difference from the bitcoin blockchain lies in that the hash is required to be unique with respect to other hashes in the blockchain. This is only possible by comparing the hash to other hashes present in the blockchain. In contrast, the hash as modified in the bitcoin blockchain is not tested on uniqueness, nor is it compared to any other hash. On the contrary, the bitcoin blockchain hash is evaluated according to a pre-defined criterion that is applied without regard to other hashes. Particularly, the hash is required to contain a predefined number of zeroes at the start.

In a preferred embodiment, said file concerns a PDF-based document, wherein said file identifier concerns a file ID pair comprising a first ID and a second ID; wherein said file ID pair preferably concerns an ID array corresponding to ISO 32000-1 and/or ISO 32000-2 comprising a first byte string concerning a first file identifier and a second byte string concerning a second file identifier, wherein said ID array is not encrypted independent of the fact whether or not a portion of said file has been encrypted; wherein said first ID concerns a permanent ID for identifying an original version of said file; wherein said second ID concerns a changing ID for identifying an adapted version of said file; and wherein said creating and/or revising of the file identifier in step (b.i) involves revising solely said second ID so that said file ID pair is made unique with respect to the blockchain while preserving the first ID. The advantages of the invention are particularly pronounced in such an embodiment, where the invention provides an answer to a well-known and publicized need for a unique file identifier. Such file identifier already being part of existing PDF specifications, the ISO 32000-2 specification states that "PDF writers should attempt to ensure the uniqueness of file identifiers" (See Sect. 14.4). Particularly, the specification discloses "File identifiers shall be defined by the optional ID entry in a PDF file's trailer dictionary. The value of this entry shall be an array of two byte strings. The first byte string shall be a permanent identifier based on the contents of the file at the time it was originally created and shall not change when the file is updated. The second byte string shall be a changing identifier based on the file's contents at the time it was last updated. When a file is first written, both identifiers shall be set to the same value. If the first identifier in the reference matches the first identifier in the referenced file's ID entry, and the last identifier in the reference matches the last identifier in the referenced file's ID entry, it is very likely that the correct and unchanged file has been found. If only the first identifier matches, a different version of the correct file has been found. [ . . . ] PDF writers should attempt to ensure the uniqueness of file identifiers. This may be achieved by computing them by means of a message digest algorithm such as MD5 [ . . . ], using the following information: the current time, the string representation of the file's location [or] the size of the file in bytes"" (See Sect. 14.4) As such, the specification does not provide an adequate solution to the problem of unique identification, instead suggesting applying a message digest algorithm, which is inadequate for the problem at hand since hash collision may easily occur, and moreover there is no claim by the user to the unique file identifier, as is possible with the present invention. Furthermore, importantly, as of PDF 2.0 there is always a file identifier and this file identifier is always a direct object, even if the file itself is encrypted. This is witnessed by Sect. 7.5.5 of the specification, disclosing an "ID (array)", i.e. "an array of two byte-strings constituting a file identifier for the file. The array shall have a minimum length of 16 bytes. If there is an Encrypt entry, this array and the two byte-strings shall be direct objects and shall be unencrypted." This is important in the context of the present invention: since the file identifier is not encrypted, it is always possible to check it to assure that the correct file is being accessed without decrypting the file. The value of the file identifier is impacted and processed by the present invention, and hence, having the file identifier available even without decrypting the file implies that also encrypted PDF-based documents may be processed by the present invention.

In an alternative embodiment, said file concerns an XLM-based document, preferably an XML-document, and the file identifier may relate to a tag and/or attribute present in the XML-based document.

In a preferred embodiment, step (a) comprises receiving a location of said file from said user; wherein said file reference established in step (c) further comprises said location; wherein said location preferably comprises a location alternative concerning a URL. This is advantageous because it offers a solution for the problem of reference rot, in which the provider of a file, i.e. the user, is no longer dependent on the first location, preferably comprising a URL, with which he provides the file. The user can indeed provide a new location for the file, and can record this new link between this existing file and the new location. As each location reference is characterized by a date, a visitor requesting access to the file on the blockchain can easily retrieve the most recently recorded location. Thus, the invention provides a method and a system of persistent locations, in which the file hash acts as file identification. Contrary to related methods of the state of the art, such as a system based on a digital object identifier (DOI), no central authority is involved in the recording and provision of the location of the file, thanks to the advantageous distributed character of the used blockchain. Each file can easily be retrieved in the blockchain via its file hash. For an obsolete location, where no file can be found anymore, it can also be retrieved which file or which files have ever been linked. Also, there are provisions for authenticity and non-repudiation, thanks to the signing of the hash-related string by the user. In a preferred embodiment, the hash-related string concerns the file hash, in which, by signing, the user recognizes having access to the file. In another embodiment, the hash-related string relates to a combination of the file hash and the location, in which, by signing, the user recognizes that the file and the location are mutually linked. Further advantages relate to the recording of a precise date of disclosure of a file, the disclosure being "official" in that a location is provided along with the file reference, allowing an integrity control, and retrieving historical data with respect to a file.

In one embodiment, said hash-related string established in step (c) consists of said hash. This embodiment may be advantageous for its simplicity and compactness, requiring only the manipulation of the file hash in the process of letting the user sign with the user's private key.

In another preferred embodiment, said hash-related string established in step (c) is generated based on both the file hash and based on a portion of further data, wherein said portion of further data is preferably determined by the file and/or the location and/or an earlier version of the file, and wherein said hash-related string preferably comprises a concatenation of said file hash and said portion of further data. This is advantageous for instance in the case of a changed file location, whereby the hash-related string relates to a combination of the file hash and the location, and whereby, by signing, the user recognizes that the file and the location are mutually linked. This is discussed further above.

In a further preferred embodiment, said registration in step (d) is realized provided that said user identity belongs to a plurality of user identities that registered in a web-of-trust and/or with a Certificate Authority. This has the advantage that file references (or, equivalently, document references) in the blockchain already comply with a certain quality mark when specifying them. This preferred embodiment is preferably associated with the use of a blockchain that is adapted for signed registration of files, e.g. for signing PDF-based documents, rather than a blockchain that is already in use for another aim such as the bitcoin blockchain.

In a further preferred embodiment, said private key is saved on a hardware security module (HSM) and/or smart card and/or USB token and/or similar device. This reduces the risk of theft of the private key.

According to another aspect, the invention provides a computer-implemented method for the verification of a file, preferably a PDF-based document; said file registered by a user in a blockchain; said file comprising a file identifier and optionally a blockchain identifier; said method comprising the steps of:
(01) receiving said file;
(02) extracting a file identifier from said file and optionally a blockchain identifier;
(03) determining a location of said blockchain, optionally based on said blockchain identifier;
(04) retrieving a file reference and a timestamp associated with said file reference from said blockchain based on said file identifier, said file reference comprising an encrypted hash-related string;
(05) verifying an identity of said user based on said timestamp and a public key obtainable from said file reference, said public key belonging to a key pair comprising said public key and a private key used for encrypting said hash-related string; said verifying preferably based on a public certificate associated with said public key;
(06) verifying the integrity of said file and/or optionally a location of said file and/or optionally a portion of further data, said verifying based on at least a decrypting of said hash-related string with said public key.

In a further preferred embodiment, said step (02) comprises extracting a blockchain identifier, wherein step (03) comprises determining a location of said blockchain based on said blockchain identifier.

As mentioned, said verification method advantageously makes use of all the verifiable information comprised in the file reference and the file as produced by the present invention. Hereby, the determining of a location of the blockchain in step (03) may in one embodiment be done manually by the user. In a preferred embodiment, however, said determining in step (03) is performed based on said blockchain identifier. According to another preferred embodiment which may or may not be combined with the use of said blockchain identifier, determining the blockchain in step (03) comprises consultation of a list of preferred blockchains or "trusted blockchains". In such an embodiment, an intermediate software application, such as e.g. a document viewer or a PDF-based document viewer, may assist the user by periodically downloading a list of trusted blockchains from a source which is in itself trusted. Such a practice is comparable to current practice with respect to PDF-based documents and trusted Certificate Authorities. For instance, the Adobe™ Approved Trust List allows, for a given PDF-based document, to determine whether the certificates relating to the PDF-based document can be traced back to the high-assurance, trustworthy certificates on this list.

According to another aspect, the present invention provides a file reference as generated by a method/system for signed registration of a file according to the present invention.

According to another aspect, the invention provides a use of the method for the signed registration of said file, according to the present invention and in all its embodiments, in the system for the signed registration of said file by a plurality of users, according to the present invention and in all its embodiments. Related, according to yet another aspect, the invention provides a use of the method for the verification of said file, according to the present invention and in all its embodiments, in the system for the verification of said file, according to the present invention and in all its embodiments.

An exemplary embodiment of a method of the present invention according to one aspect of the invention is illustrated in FIG. 1. It relates to computer-implemented method 100 for the signed registration of a PDF-based document by a user, said method comprising the steps:
 (a) receiving 101 said PDF-based document from said user;
 (b) calculating 102 a hash belonging to said PDF-based document with a cryptographic hash function;
 (c) establishing 103 a document reference taking into account said hash;
 (d) registering 104 said document reference in a blockchain;
characterized in that said establishing in step (c) comprises encrypting 103 said hash by means of a private key belonging to a key pair belonging to a key pair belonging to said user for obtaining a signed hash, said key pair comprising said private key and a public key; that said document reference comprises said signed hash; and that said document reference comprises a user identity for retrieving said public key.

Figure 2:
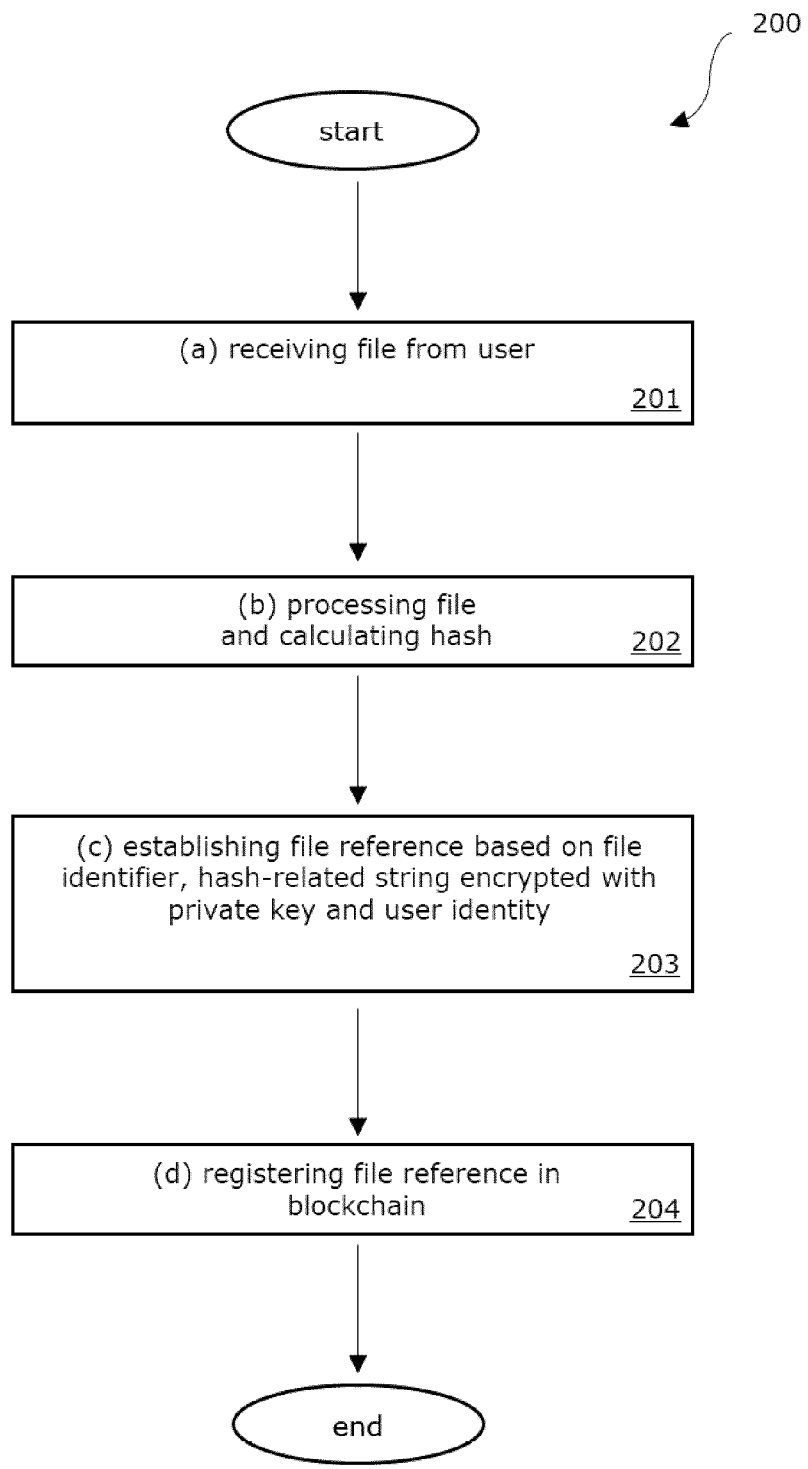
FIG. 2 illustrates an exemplary embodiment of the method according to claim 1 of the present invention.

An exemplary embodiment of the method according to claim 1 is illustrated in FIG. 2. It relates to a computer-implemented method 200 for the signed registration of a file, preferably a PDF-based document, by a user in a blockchain, said method comprising the steps of:
 (a) receiving 201 said file from said user;
 (b) processing said file and calculating a hash for said file 202, said step (b) comprising the sub-steps
  (b.i) processing said file by creating and/or revising a file identifier comprised in said file so that it is unique with respect to the blockchain, obtaining a uniquely identified file;
  (b.ii) calculating the hash of said uniquely identified file comprising said file identifier with a cryptographic hash function;
  (b.iii) optionally, determine if the hash obtained in step (b.ii) is unique with respect to the blockchain and if so, ending step (b); if not, resuming from step (b.i);
 (c) establishing 203 a file reference taking into account said hash;
 (d) registering 204 said file reference in the blockchain;
wherein said file reference established in step (c) comprises said file identifier and a hash-related string; wherein step (c) comprises establishing a hash-related string comprising said hash; wherein step (c) comprises encrypting 203 said hash-related string by means of a private key belonging to a key pair belonging to said user for obtaining said hash-related string, said key pair comprising said private key and a public key; and wherein said file reference comprises a user identity for retrieving said public key.

In the present invention, the document reference comprises a user identity for retrieving the public key belonging to the user. In a preferred embodiment, the user identity comprises the actual public key. In an alternative embodiment, the user identity only comprises a key-related reference allowing a user to link a user identity to the public key. The user identity could for example comprise a user identification number, which is linked to one or more public keys such as said public key via a related aspect of the invention, for example by means of a web-of-trust and/or a second blockchain or exactly the same said blockchain.

In a further preferred embodiment, said blockchain is publicly available. This has the additional advantage of an increased transparency. For users, it allows them to publicly provide the list of documents that are signed by the user within the secure context of the present invention. For receivers and consumers of documents, it provides a useful instrument for verifying the integrity, authenticity and non-repudiation of a particular document, without any restrictions as to the access to the blockchain.

In a further preferred embodiment, the document reference comprises said hash as obtained in step (b), i.e. the non-encrypted hash. This has the advantage that searches with respect to a document can be carried out in a very simple way, without having to know the author of the document and his public key.

In a preferred embodiment, said web-of-trust is at least partially registered in said blockchain. Such an embodiment has the advantage that no separate model should be used for the web-of-trust, which improves the simplicity. Moreover, the web-of-trust has in this way the known advantages of the blockchain, allowing irreversible, incontestable and distributed recording of the user identity related data, including timestamping.

In a further preferred embodiment, step (b) comprises determining a document-ID-pair, in which said calculation of the hash is carried out for a modified version of said file, preferably said PDF-based document, comprising said document-ID-pair and the file, preferably the PDF-based document, received in step (a), in which said document-ID-pair comprises a first document-ID and a second document-ID, in which said first document-ID is determined taking into account a document-ID-pair of an earlier version of said file, preferably said PDF-based document, if existing, and in which said second document-ID is at least determined in such way that both said document-ID-pair on the one hand and said hash on the other hand are unique with respect to the blockchain, and that said document reference that has been specified in step (c) comprises said document-ID-pair. In a preferred embodiment, said "being unique" is realized according to the following substeps, all belonging to step (b):
 (b.i) choosing a second document-ID so that the document-ID-pair is unique with respect to the blockchain;
 (b.ii) calculating the hash belonging to a modified version of said file, preferably said PDF-based document, comprising the file, preferably the PDF-based document, received in step (a) and the document-ID-pair resulting from substep (b.i);
 (b.iii) determining if the hash obtained in step (b.ii) is unique and if so, ending step (b), if not, resuming from step (b.i).

Such an embodiment has important additional advantages. First of all, by verifying the uniqueness, the problems of a possible hash collision are avoided. At least equally important is however the possibility for a user to create a 'family' of documents, in which the first version of a document is related to one or more recent versions of the same document, as a result of which they have one and the same first document-ID in common. This has the advantage that the blockchain can be even more useful for a user or a receiver for searching details with respect to a document. In a preferred embodiment, the document-ID-pair can be chosen in such way that as to aspects of notation such as length and allowed characters, it corresponds to already existing notations for document-ID-pairs. In an alternative embodiment, the first document-ID can be chosen equal to the hash belonging to an earlier version of the relevant document, whether or not combined with parts of a user identity, and/or the second document-ID can be chosen equal to the "new" hash belonging to the relevant document. This offers advantages as to the traceability of documents. This preferred embodiment is preferably also combined with the use of a blockchain that is specifically adapted for the signed registration of files, preferably PDF-based documents.

In a related alternative embodiment, it is not step (b), but step (c) that comprises the determining of a document-ID-pair belonging to said document reference, in which said document-ID-pair comprises a first document-ID and a second document-ID, in which said first document-ID is determined taking into account said hash and/or a hash of an earlier version of said file, preferably said PDF-based document, if existing, and in which said second document-ID is at least determined in such way that said document-ID-pair is unique with respect to the blockchain. This embodiment leads to similar advantages as the one described above, in which the document-ID-pair is determined in step (b), except that it is possible in this embodiment that the obtained hash is not unique with respect to the blockchain, and that a hash collision thus occurs. However, the document-ID-pair is always unique, as a result of which the problems of hash collision can be avoided, by considering the document-ID-pair, and not the hash, as a unique characteristic.

In a further preferred embodiment, a replacement of said key pair belonging to said user by a new key pair belonging to the same said user comprises a registration on said web-of-trust. This has the advantage that said web-of-trust can group the documents of one and the same user under one and the same user identity, with larger simplicity as a result.

In a further preferred embodiment, said blockchain at least partially overlaps with the technology of the bitcoin blockchain. This has the advantage that an existing system can be further developed. As a result of the nature of the blockchain, in which data can be adjusted inappropriately only when certain conditions are met, e.g. if a majority of the calculation force represented in the nodes "conspires", it can be advantageous to make use of a similar large blockchain as the bitcoin blockchain. In a large blockchain, it is indeed very improbable that a majority of the calculation force is taken over by an attacker.

In a further preferred embodiment, said cryptographic hash function belongs to the family of Secure-Hash-Algorithms (SHA), such as for example SHA-256. The algorithm has the advantage that it has been proven and that efficient algorithms are available for carrying out hashing.

In a further preferred embodiment, said document reference comprises a supplementary hash that is different from said hash as obtained in step (b) and different from said signed hash. In a possible embodiment, said supplementary hash can be used for avoiding potential problems with hash collision, by using not only the hash as obtained in step (b), but the combination of this hash with the supplementary hash as a unique identification.

In a preferred embodiment, said hash is unique with respect to the blockchain. Problems with the uniqueness of said hash, such as in case of 'hash collision", can however easily be avoided. A possibility is the use of said document-ID-pair. Another possibility is by also including, in the document reference, next to the result of the hash function, another characteristic of the registration as a form of "supplementary hash". In a preferred embodiment, such a supplementary hash comprises a time stamp that relates to the present and a previous registration, preferably the first registration of the file in the blockchain. In a further preferred embodiment, the supplementary hash comprises data relating to any other characteristic of the present or a previous registration, such as a user identity. Such options related to the use of an identification string, or, equivalently, a file identifier. It should further be noted that an embodiment is even possible in which the identification string is only composed of the hash of the document and in which no checks are carried out as to the uniqueness of the hash. When using a sufficiently advanced hash function such as SHA-256, the risk of hash collision is indeed negligibly small. Should such a collision still exceptionally take place, then this hash collision can be easily detected by searching in the blockchain.

In an alternative embodiment, both a (default) hash and a supplementary hash is provided, in which the hash that is linked to a (default) hash function, and the supplementary hash that is linked to a supplementary hash function is different from said (default) hash function. Both hash functions are carried out on the file and thus lead to two different hashes, which are included in the identification string. The advantage of such a method is that it guarantees the security if one of both hash functions is compromised. If, for example, the (default) hash function gets compromised since the signing, then, it can be possible to make changes in the document without changing the corresponding (default) hash. This is problematic, because then a conflict can occur about which of both documents has been signed in the past, the original document or the adapted document. By providing a supplementary hash function, this problem can be avoided. As long as this supplementary hash function is not compromised, this offers another supplementary hash at the adapted document as well as at the original document. In this way, the adaptation in the document can still be detected, and the conflict can be solved.

In a further preferred embodiment of a system of the present invention, at least one of said plurality of devices comprises a hardware security module and/or smart card and/or USB token and/or similar device. This has the advantage that the risk of theft of the private key is limited.

In a further preferred embodiment of a system of the present invention, the fact that a user identity linked to a client application is compromised, leads to the removal of said compromised user identity from said plurality of user identities that have been registered in said web-of-trust. This leads to a better organization of said web-of-trust.

According to another aspect, which is not intended to limit the scope in any way, the invention relates to a computer-implemented method for the signed registration of a file, preferably a PDF-based document (Portable Document Format), by a user, said method comprising the steps:

(a) receiving said file from said user;
(b) calculating a hash based on said file with a cryptographic hash function;
(c) establishing a file reference, preferably a document reference, taking into account said hash;
(d) registering said file reference in a blockchain;

characterized in that said establishing in step (c) comprises encrypting said hash by means of a private key belonging to a key pair belonging to said user for obtaining a signed hash, said key pair comprising said private key and a public key; that said file reference comprises said signed hash; and that said file reference comprises a user identity for retrieving said public key.

A first advantage of such a method is the decentralized character of both the signing and the registering of the file, preferably a PDF-based document. The document reference can be considered as a kind of decentralized electronic signature. This allows an integral decentralized method for recording content, author and time belonging to a file. The present invention is hereby based on a blockchain, a proven technology allowing irreversible, incontestable and distributed recording of references, in which it is typical for the operation of the blockchain that this distributed recording is also provided with a non-adaptable and incontestable time stamp. This is in contrast to a method of the state of the art, in which at least one of these aspects either is not treated or is treated according to a centralized model.

Concretely, this method allows an integral decentralized method for recording content, author and time belonging to a file, preferably a PDF-based document, in particular in the following way.

The recording of the content comprises the application of a cryptographic hash function, for obtaining a hash, in this context the original hash. For a receiver of the document, this allows to retrieve the integrity of the file, by calculating by himself or herself a second hash of the received document, and by comparing this to the original hash that is available to him or her. In this way, the use of the hash supports the provision of a mechanism for verifying the integrity. In a preferred embodiment, the original hash is calculated for the whole file, including the file ID pair, preferably the document-ID-pair, if present. In an alternative embodiment, the original hash is calculated for only a part of the document. In still an alternative embodiment, the file ID pair is only recorded after the calculation of the hash, and the hash is calculated for the whole file excluding the file ID pair.

The recording of an author of the document comprises the application of Public Key Infrastructure (PKI). Because the author encrypts said hash with his private key, a receiver of the encrypted hash can verify by means of the public key that is also available if no one else than the relevant author has encrypted the particular hash, which is important when realizing authentication and non-repudiation.

The recording of a time and the registration of the link between document and author is realized by means of the blockchain. Concretely, a document reference is registered in the blockchain. Hereby, the document reference comprises at least the combination of the encrypted hash and the user identity. In this way, the document reference finds a unique link between the document and the author. As it is typical for the operation of a blockchain that this document reference is also immediately provided with a time stamp, the time is also recorded at the registration.

The linked use of the hash, the key pair and the blockchain meets the need for an integrated mechanism for integrity, authenticity and non-repudiation that is moreover decentralized.

Provisions are made for authenticity. If, for example, an opponent who is different from the author claims to be the author of the relevant document, the user can then refer to a registered document reference to prove that at the time specified in the blockchain, he was already the owner of this document. If, moreover, the opponent provides an own registered document reference for the same document, the times specified in the blockchain should then be compared to verify who was the first to register the document.

Provisions are made for non-repudiation. If a user claims not to be the source of a particular document, this claim can at least partially be refuted if a document reference is present in the blockchain with the indication of the user identity of the user. In such case, it is certain that the document has been signed with the private key belonging to the user, that should belong to no one else than the user.

Integrity is also provided for in this way, because a receiver of the document can verify that the hash and the related document are certain to be originating from the author. For this reason, the hash can thus function as a full instrument for verifying the integrity of the received document.

Please note that hereby, it is not important if the content of the document is confidential or accessible for the public, as in the method, no portions of the actual document are registered in the blockchain.

Another advantage of the method of the present invention is that there is no need for a Timestamp Authority (TSA) controlling the attribution of time stamps, which is typically the case in a method of the state of the art. The use of such a TSA is thus unnecessarily complex. Related thereto, in several embodiments of the present invention, there is also no need for a Certificate Authority (CA) controlling authorship. The use of such a CA may in several cases be unnecessarily complex.

Another advantage is that it is avoided that the electronic signature is sent together with the document. Such a common way of working has the important disadvantage that a user cannot verify if he is the only one signing documents with his/her private key, as a result of which a possible theft of a private key is sometimes only revealed very late. On the contrary, a method of the present invention allows that a user carries out a search that is specific for his/her own public key on the blockchain, and in this way, finds out if documents have been registered that are unknown to the user. In the latter case, the user can then immediately take measures, strongly limiting the risk of later problems.

Another advantage of the present invention is that the blockchain realizes in this way a user-friendly and transparent inventory of documents. First of all, a simple search for documents of a particular user can immediately provide a whole list of references to anyone having access to the blockchain. This can also allow to identify possible duplicate document references, i.e. documents that have been signed more than once. Furthermore, in an embodiment in which the non-encrypted (or, equivalent, non-signed) hash has been included in the document reference, a search can also very simply be carried out for this hash, in order to find out if the document has been registered, and if there aren't any problems with it, such as for example in case several references are present in the blockchain with mutually different authors. The same advantage can also be realized by using a unique document-ID-pair, as described in the present document. Note that such a search is also possible in an embodiment with a document reference without document-ID-pair or non-signed hash, in which (next to the user identity) only the signed hash is included in the document reference. In such case, one can imagine a system of the present invention which previously calculates the non-signed hash for the relevant document references based on the public key, which can be retrieved via the user identity. Such a system would for example, for any new document at the time when it becomes available from the encrypted hash, calculate the non-encrypted hash.

Another advantage of the present invention is that document references are collectively available, so that anyone having access to the blockchain, can see details about the used type of hash function and/or PKI encryption and/or technique for signing. If a particular technique is known not to be considered as trustworthy any more, large groups of users can immediately be informed about it, and by extension, they can be encouraged to "renew" the signature of their existing documents by means of another, more secure technique. It can also be easily verified of this "renewal" is actually carried out. Such a large-scale problem identification is inconceivable in a case in which electronic signatures are sent together with the actual document.

In a second aspect, the invention relates to a system for the signed registration of a file, preferably a PDF-based document, said system comprising a plurality of mutually linked devices, each of the devices comprising a processor, tangible non-volatile memory, instructions in said memory for controlling said processor, a client application, in which for each device, the client application is configured for carrying out a method of the present invention, in which the user identity for retrieving the public key is linked one to one to the client application.

Such a system has the advantage that a more controllable environment can be created, allowing to take fast action in diverse situations, such as the case of a compromised HSM.

In a third aspect, the invention relates to a use of the method of the present invention in a system of the present invention.

In a fourth aspect, the invention relates to a computer program product for carrying out a computer-implemented method for the signed registration of a file, preferably a PDF-based document, of the present invention, which computer program product comprises at least one readable medium in which computer-readable program code portions are saved, which program code portions comprise instructions for carrying out said method.

According to a further aspect of the invention, that is not intended to limit its scope in any way, the invention relates to following points 1-17.

1. Computer-implemented method for the signed registration of a PDF-based document (Portable Document Format) by a user, said method comprising the steps of:
    (a) receiving said PDF-based document from said user;
    (b) calculating a hash belonging to said PDF-based document with a cryptographic hash function;
    (c) establishing a document reference taking into account said hash;
    (d) registering said document reference in a blockchain; characterized in that said establishing in step (c) comprises encrypting said hash by means of a private key belonging to a key pair belonging to said user for obtaining a signed hash, said key pair comprising said private key and a public key; in that said document reference comprises said signed hash; and in that said document reference comprises a user identity for retrieving said public key.

2. Method of the previous point 1, characterized in that said blockchain is publicly accessible.

3. Method of the previous point 1 and 2, characterized in that said document reference comprises said non-encrypted hash as obtained in step (b).

4. Method of any of the previous points 1 to 3, characterized in that said registration in step (d) takes place provided that said user identity belongs to a plurality of user identities registered in a web-of-trust.

5. Method of the previous point 4, characterized in that said web-of-trust is at least partially registered in said blockchain.

6. Method of any of the previous points 1 to 5, characterized in that step (b) comprises determining a document-ID-pair, in which said calculation of the hash is carried out for a modified version of said PDF-based document comprising said document-ID-pair and the PDF-based document received in step (a), in which said document-ID-pair comprises a first document-ID and a second document-ID, in which said first document-ID is determined taking into account a document-ID-pair of an earlier version of said PDF-based document, if existing, and in which said second document-ID is at least determined in such way that both said document-ID-pair on the one hand and said hash on the other hand are unique with respect to the blockchain, and that said document reference established in step (c) comprises said document-ID-pair.

7. Method of any of the previous points 1 to 5, characterized in that step (c) comprises the determining of a document-ID-pair belonging to said document reference, in which said document-ID-pair comprises a first document-ID and a second document-ID, in which said first document-ID is determined taking into account said hash and/or a hash of an earlier version of said PDF-based document, if existing, and in which said second document-ID is at least determined in such way that said document-ID-pair is unique with respect to the blockchain.

8. Method of any of the previous points 1 to 7, characterized in that said private key is saved on a hardware security module (HSM) and/or smart card and/or USB token.

9. Method of any one of the previous points 4 to 8, characterized in that a replacement of said key pair belonging to said user by a new key pair belonging to the same said user comprises a registration on said web-of-trust.

10. Method of any one of the previous points 1 to 9, characterized in that said blockchain overlaps at least partially with the technology of the bitcoin blockchain.

11. Method of any one of the previous points 1 to 10, characterized in that said cryptographic hash function belongs to the family of Secure-Hash-Algorithms (SHA).

12. Method of any of the previous points 1 to 11, characterized in that said document reference comprises a supplementary hash that is different from said hash as obtained in step (b) and different from said signed hash.

13. System for the signed registration of a PDF-based document by a plurality of users, said system comprising a plurality of mutually linked devices, each of the devices comprising a processor, tangible non-volatile memory, instructions on said memory for controlling said processor, a client application, in which for each device, the client application is configured for carrying out a method according to the previous points 1 to 12, in which a user identity for retrieving a public key for at least one of the users is linked one-to-one to the client application on the device belonging to said user.

14. System of point 13, characterized in that at least one of said plurality of devices comprises a hardware security module and/or smart card and/or USB token.

15. System of any of the previous points 13 and 14, characterized in that a registration of a document reference in a blockchain takes place provided that said user identity belongs to a plurality of user identities registered in a web-of-trust; and that the fact that the user identity linked to the client application is compromised, leads to the removal of said compromised user identity from said plurality of user identities that have been registered in said web-of-trust.

16. Use of the method of any of the points 1 to 12 in the system of any of the points 13 to 15.

17. Computer program for carrying out a computer-implemented method for the signed registration of a PDF-based document of any of the previous points 1 to 12, which computer program product comprises at least one readable medium in which computer-readable program code portions are saved, which program code portions comprise instructions for carrying out said method.

According to yet another aspect of the invention, that is not intended to limit its scope in any way, the invention relates to an alternative computer-implemented method for the signed registration of a file, preferably a PDF-based document, by a user in a blockchain, said method comprising the steps of:
 (a) receiving said file from said user;
 (b) processing said file and calculating a hash for said file, said step (b) comprising the sub-steps
  (b.i) processing said file by revising a portion of said file so that the file is uniquely identifiable with respect to the blockchain;
  (b.ii) calculating the hash of said uniquely identifiable file comprising said revised portion with a cryptographic hash function;
  (b.iii) determining if the hash obtained in step (b.ii) is unique with respect to the blockchain and if so, ending step (b); if not, resuming from step (b.i);
 (c) establishing a file reference taking into account said hash;
 (d) registering said file reference in the blockchain;
wherein said file reference established in step (c) comprises a hash-related string; wherein step (c) comprises establishing a hash-related string comprising said hash, optionally being said hash; wherein step (c) comprises encrypting said hash-related string by means of a private key belonging to a key pair belonging to said user for obtaining said hash-related string, said key pair comprising said private key and a public key; and wherein said file reference comprises a user identity for retrieving said public key. This alternative computer-implemented method may relate to any preferred embodiment of the present invention. For instance, in a further preferred embodiment, the alternative method, preferably step (b.i), further comprises processing said file by adding a blockchain identifier to said file for identifying the blockchain used for the signed registration of said file. In a further preferred embodiment of said alternative method, said blockchain identifier is encrypted by means of a blockchain-related private key belonging to a blockchain-related key pair belonging to a blockchain-related authority, said blockchain-related key pair comprising said blockchain-related private key and a blockchain-related public key. In another preferred embodiment of said alternative method, step (a) comprises receiving a location of said file from said user; wherein said file reference established in step (c) further comprises said location; wherein said location preferably comprises a location alternative concerning a URL. In another preferred embodiment of said alternative method, said hash-related string established in step (c) consists of said hash. In another preferred embodiment of said alternative method, registration in step (d) takes place provided that said user identity belongs to a plurality of user identities registered in a web-of-trust and/or with a Certificate Authority.

Said alternative computer-implemented method differs from the computer-implemented method according to claim 1 in that a file identifier need not be present. Said portion may concern said file identifier but may as well relate to the simple editing of the document, e.g., by adding characters at a position in the file where such adding does not impact the output related to the file. In a first example wherein the file is a PDF-based document, said file portion may be situated near the last of one or more end-of-file markers comprised in the file, at a position where the consistency of the xref-table comprised in the PDF-based document is not impacted. The editing may concern the adding of one or more characters, for instance the adding of one whitespace for each time that step (b.i) is executed. In a second example, said file is an XML-based file, and the file portion may be situated between a first inter-related code portion and a second inter-related code portion. Also here, the editing may concern the adding of one or more characters, for instance the adding of one whitespace for each time that step (b.i) is executed.

In the following, the present invention is described based on a non-limiting example, for illustrating the invention in a particular embodiment.

Example 1

Decentralized Method and Decentralized System

This example supposes a system of the present invention, whereby the files concern PDF-based documents. The system comprises a plurality of said devices, called SYSTEM entities here, that are mutually connected via a network such as the internet. Each SYSTEM entity comprises a CLIENT component and an HSM. The CLIENT component corresponds to said client application and can for example be built in a document management system that is available on the SYSTEM entity and/or a web browser that is available on the SYSTEM entity. The user identity, called IDENTITY specification here, is used to identify the person or the company that possesses the CLIENT component, the HSM and the SYSTEM entity. Said web-of-trust comprises each IDENTITY specification. A new IDENTITY specification is only trusted if it presents itself at the web-of-trust and is approved by a sufficient number of other IDENTITY specifications that are present on the web-of-trust, such as companies that know and trust each other. The web-of-trust is for example used when an HSM must be replaced or when the key pair on the HSM has expired, or because the encryption-algorithm used in combination with the key pair must be updated.

Each CLIENT component maintains a copy of the BLOCKCHAIN database composed of blocks, corresponding to said blockchain. Each block in the BLOCKCHAIN database comprises a list of said document-ID-pairs, said signed hashes of the PDF-based documents, and information about the user comprised in the user identity. The BLOCKCHAIN database itself is public, and doesn't give access to the content of documents. As to the possible distribution of documents, it is the SYSTEM entity that entirely decides. The signed hash is hereby called SIGNATURE, and is registered in combination with the document-ID-pair and the IDENTITY specification in the BLOCKCHAIN database. Hereby, the combination of SIGNATURE, document-ID-pair and IDENTITY specification corresponds to said document reference.

Thanks to this specific combination of aspects in this embodiment, the presence of the combination of document-ID-pair, SIGNATURE and IDENTITY specification is a unique and irrevocable proof of the existence of said document at the time of registration. In a preferred embodiment, the corresponding system comprises provisions that prohibit that registrations are made in the BLOCKCHAIN database with an IDENTITY specification which is known to be compromised.

It will be understood that the present invention is not limited to the embodiments described above and that some adjustments or changes can be added to the described examples without changing the scope of the enclosed claims. The present invention has for example been described with reference to a separate blockchain destined for signed registration of PDF-based documents, but it will be clear that the invention can be applied with a blockchain that is acquainted with another use, such as for example the bitcoin blockchain. As a file format, PDF is also mentioned, but it can actually also be another file format. It can for example be a format for word processing or word display, but it can also be an image (either pixel based, or vector based), a media file such as an audio fragment or a film fragment, a JSON file (JavaScript Object Notation), or a specialized file format such as for example a computer aided design (CAD) file.

Example 2

Verification Example

In this example, a recipient of a file intends to verify a file received for which a file reference is present in the blockchain. In this example, the file reference comprises blockchain identifier. The recipient may for instance be a customer receiving an electronic invoice, e.g. a PDF document. The recipient may open the invoice on a computer in a viewer program that is able to handle verification according to the present invention. This may for instance concern a PDF Viewer that supports blockchain signatures and the verification of these signatures.

The recipient may now perform the following checks:

Determine which blockchain was used by examining a property added to the file, e.g. a PDF. One can imagine a rogue vendor to use a blockchain that isn't the official blockchain to mislead the customer. Official organizations, such as governments, could set up an official blockchain that can be identified as the real blockchain for invoices by the customer. If an invoice doesn't point at the real blockchain, there's a high chance that the invoice is fake: the vendor didn't use the official blockchain.

Determine if the invoice was registered on the real blockchain. That's easy to check using the file identifier comprised in the file, e.g. an invoice. If the file identifier is not known on the blockchain, it is likely that the invoice is fake: the vendor did not register the invoice on the official blockchain.

Once the record is retrieved from the blockchain, the recipient knows who signed the hash of the file, e.g. the invoice, and when this happened, since the file reference is associated with a timestamp. The customer can check the signature to verify the identity of the signer. Is that signer known on the web of trust or is that signer known by a CA? If not, it is likely that the invoice is fake: the source, e.g. a vendor, might not be who he pretends to be.

Finally, the hash of the file, e.g. an invoice, can be compared with the hash that was signed in the blockchain. If those hashes do not correspond, it is likely that the invoice is fake: the content of the invoice was tampered with.

The invention claimed is:

1. Computer-implemented method for the signed registration of a file, a PDF-based document, by a user in a blockchain, said method comprising the steps of:
 (a) receiving said file from said user;
 (b) processing said file and calculating a hash for said file, said step (b) comprising the sub-steps
  (b.i) processing said file by creating and/or revising a file identifier comprised in said file so that it is unique and new with respect to the blockchain, obtaining a uniquely identified file;
  (b.ii) calculating a hash of said uniquely identified file comprising said file identifier with a cryptographic hash function;
  (b.iii) determining if the hash obtained in step (b.ii) is unique and new with respect to the blockchain and if so, ending step (b); if not, resuming from step (b.i);
 (c) establishing a file reference taking into account said hash;
 (d) registering said file reference in the blockchain;
wherein said file reference established in step (c) comprises said file identifier and a hash-related string; wherein step (c) comprises establishing a hash-related string comprising said hash; wherein step (c) comprises encrypting said hash-related string by means of a private key belonging to a key pair belonging to said user for obtaining said hash-related string, said key pair comprising said private key and a public key; and wherein said file reference comprises a user identity for retrieving said public key.

2. Method according to claim 1, wherein said file is a PDF-based document and wherein said file identifier is a file ID pair.

3. Method according to claim 2, wherein said file identifier is said file ID pair comprising a first ID and a second ID; wherein said file ID pair concerns an ID array corresponding to ISO 32000-1 and/or ISO 32000-2 comprising a first byte string concerning a first file identifier and a second byte string concerning a second file identifier, wherein said ID array is not encrypted independent of the fact whether or not a portion of said file has been encrypted; wherein said first ID concerns a permanent ID for identifying an original version of said file; wherein said second ID concerns a changing ID for identifying an adapted version of said file; and wherein said creating and/or revising of the file identifier in step (b.i) involves revising solely said second ID so that said file ID pair is made unique and new with respect to the blockchain while preserving the first ID.

4. Method according to claim 1, wherein the method, step (b.i), further comprises processing said file by adding a blockchain identifier to said file for identifying the blockchain used for the signed registration of said file.

5. Method according to claim 4, wherein said blockchain identifier is encrypted by means of a blockchain-related private key belonging to a blockchain-related key pair belonging to a blockchain-related authority, said blockchain-related key pair comprising said blockchain-related private key and a blockchain-related public key.

6. Method according to claim 1, wherein step (a) comprises receiving a location of said file from said user; wherein said file reference established in step (c) further comprises said location; wherein said location comprises a location alternative concerning a URL.

7. Method according to claim 1, wherein said hash-related string established in step (c) consists of said hash.

8. Method according to claim 1, wherein said hash-related string established in step (c) is generated based on both the file hash and based on a portion of further data, wherein said portion of further data is determined by the file, the location, or an earlier version of the file, and wherein said hash-related string comprises a concatenation of said file hash and said portion of further data.

9. Method according to claim 1, wherein said registration in step (d) takes place provided that said user identity belongs to a plurality of user identities registered in a web-of-trust and/or with a Certificate Authority.

10. Method according to claim 1, wherein said private key is saved on a hardware security module (HSM) and/or smart card and/or USB token.

11. Computer-implemented method for the verification of a file, a PDF-based document; said file registered by a user in a blockchain; said file comprising a file identifier and a blockchain identifier; said method comprising the steps of:
  (01) receiving said file;
  (02) extracting a file identifier from said file and a blockchain identifier, said file identifier being unique and new with respect to the blockchain upon registration of said file by said user in said blockchain;
  (03) determining a location of said blockchain, based on said blockchain identifier;
  (04) retrieving a file reference and a timestamp associated with said file reference from said blockchain based on said file identifier, said file reference comprising an encrypted hash-related string;
  (05) verifying an identity of said user based on said timestamp and a public key obtainable from said file reference, said public key belonging to a key pair comprising said public key and a private key used for encrypting said hash-related string; said verifying based on a public certificate associated with said public key;
  (06) verifying the integrity of said file and a location of said file and a portion of further data, said verifying based on at least a decrypting of said hash-related string with said public key.

12. System for the signed registration of a file, a PDF-based document, by a plurality of users, said system comprising:
  a plurality of mutually linked devices, each of the devices comprising a processor, tangible non-volatile memory, instructions on said memory for controlling said processor, a client application, wherein for each device, the client application is configured for carrying out a method according to claim 1, wherein a user identity for retrieving a public key for at least one of the users is linked one-to-one to the client application on the device belonging to said user.

13. System for verification of a file, a PDF-based document; said file registered by a user in a blockchain; said system comprising:
  means for accessing verifiable information for creating one or more verification blockchains and means for accessing a known trusted website and/or a Certificate Authority relating to said user, said system comprising a processor, tangible non-volatile memory, instructions on said memory for controlling said processor, a client application, said client application configured for carrying out a method according to claim 11, wherein said system is optionally configured for identifying said blockchain among said one or more of the verification blockchains based on a blockchain identifier extracted from said file; wherein said system is configured for extracting a file identifier from said file and optionally said blockchain identifier, said file identifier being unique and new with respect to the blockchain upon said registration of said file by said user in said blockchain; retrieving a file reference comprising an encrypted hash-related string and a timestamp associated with said file reference from said blockchain based on said file identifier; wherein said system is configured for accessing the known trusted website and/or said Certificate Authority for verifying an identity of said user based on a public key obtainable from a file reference associated with said file and retrieved from said blockchain; and wherein said system is configured for decrypting said hash-related string with said public key for verifying said file and/or optionally a location of said file and/or optionally a portion of further data.

14. Computer program product for carrying out a computer-implemented method for the signed registration of a file, a PDF-based document, according to claim 1, which computer program product comprises at least one non-volatile memory or non-transitory computer readable storage medium in which computer-readable program code portions are saved, which program code portions comprise instructions for carrying out said method.

15. Computer program product for carrying out a computer-implemented method for the verification of a file, a PDF-based document, according to claim 11, which computer program product comprises at least one non-volatile memory or non-transitory computer readable storage medium in which computer-readable program code portions are saved, which program code portions comprise instructions for carrying out said method.

* * * * *